(12) United States Patent
Auerbach et al.

(10) Patent No.: US 8,408,721 B2
(45) Date of Patent: Apr. 2, 2013

(54) PROJECTION SYSTEM WITH IMAGING LIGHT SOURCE MODULE

(75) Inventors: Roy A. Auerbach, Dallas, TX (US);
Stephen J. Willett, St. Paul, MN (US);
Simon Magarill, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 256 days.

(21) Appl. No.: 13/057,170

(22) PCT Filed: Aug. 11, 2009

(86) PCT No.: PCT/US2009/053431
§ 371 (c)(1),
(2), (4) Date: Feb. 2, 2011

(87) PCT Pub. No.: WO2010/019594
PCT Pub. Date: Feb. 18, 2010

(65) Prior Publication Data
US 2011/0141442 A1    Jun. 16, 2011

Related U.S. Application Data

(60) Provisional application No. 61/088,953, filed on Aug. 14, 2008.

(51) Int. Cl.
*G03B 21/14* (2006.01)
*G02B 6/00* (2006.01)
(52) U.S. Cl. ............ 353/94; 353/102; 362/551; 362/615
(58) Field of Classification Search .................... 353/94, 353/98, 102, 122; 362/26, 27, 551, 554, 362/615, 616
See application file for complete search history.

(56) References Cited

U.S. PATENT DOCUMENTS

| | | | |
|---|---|---|---|
| 4,733,335 | A | 3/1988 | Serizawa |
| 6,318,863 | B1 | 11/2001 | Tiao |
| 6,517,210 | B2 | 2/2003 | Peterson |
| 6,547,400 | B1 * | 4/2003 | Yokoyama ............ 353/98 |
| 6,654,151 | B1 | 11/2003 | Yamaguchi |
| 7,009,213 | B2 | 3/2006 | Camras |
| 7,192,147 | B2 | 3/2007 | Sakata |

(Continued)

FOREIGN PATENT DOCUMENTS

| | | |
|---|---|---|
| JP | 09-230499 | 9/1997 |
| JP | 2003-172900 | 6/2003 |

(Continued)

OTHER PUBLICATIONS

Barnhoefer et al., "A Low Power, Passively Cooled 2000 cd/m$^2$ Hybrid LED-LCD Display", Consumer Electronics, 2006 IEEE Tenth International Symposium, 4 pgs., Sep. 11, 2006.
U.S. Appl. No. 60/893,804, entitled "Array of Luminescent Elements", filed Mar. 8, 2007.
U.S. Appl. No. 61/017,987, entitled "Projection System", filed Dec. 31, 2007.

*Primary Examiner* — Kevin Pyo
(74) *Attorney, Agent, or Firm* — Kristofor L. Storvick

(57) ABSTRACT

An imaging light source module that includes a plurality of light guides, a plurality of light emitting sources, and an intermediate image surface is disclosed. Each of the plurality of light guides has an entrance face, an exit face, and at least one side wall, and all of the light guides are capable of delivering light along associated light distribution axes intersecting a common reference point. Each of the plurality of light emitting sources delivers light only to a single light guide of the plurality of light guides. The intermediate image surface comprises a plurality of pixels, where each pixel receives light from the exit face of a single associated light guide of the plurality of light guides.

24 Claims, 5 Drawing Sheets

U.S. PATENT DOCUMENTS

| | | |
|---|---|---|
| 7,246,923 B2 | 7/2007 | Conner |
| 7,316,484 B2 | 1/2008 | Hatakeyama |
| 7,318,644 B2 | 1/2008 | Abu-Ageel |
| 7,810,931 B2 * | 10/2010 | Kawamura et al. ............. 353/38 |
| 2006/0001838 A1 | 1/2006 | Yoshii |
| 2006/0132725 A1 | 6/2006 | Terada |

FOREIGN PATENT DOCUMENTS

| | | |
|---|---|---|
| JP | 2005-338878 | 12/2005 |
| JP | 2007-114603 | 5/2007 |
| JP | 2007-304610 | 11/2007 |
| WO | WO 2008/109296 | 9/2008 |

* cited by examiner

PROJECTION SYSTEM WITH IMAGING LIGHT SOURCE MODULE

CROSS REFERENCE TO RELATED APPLICATIONS

This application is a national stage filing under 35 U.S.C. 371 of PCT/US2009/053431, filed Aug. 11, 2009, which claims priority to U.S. Provisional Application No. 61/088,953, filed Aug. 14, 2008, the disclosure of which is incorporated by reference in its/their entirety herein.

SUMMARY

In one aspect, the present disclosure provides a projection system including an imaging light source module and a projection lens. The imaging light source module includes a plurality of light guides, where each light guide has an entrance face, an exit face, and at least one side wall, and a plurality of light emitting sources, where each light emitting source delivers light only to a single light guide of the plurality of light guides. The projection lens is configured to receive light from the plurality of light guides and deliver the light to form a projected image. The projection lens has an optical axis and an entrance pupil having a center. In this projection system, each light guide is disposed to receive light from at least one light emitting source and deliver light though a single associated pixel of a plurality of pixels of an intermediate image surface, to the entrance pupil of the projection lens. Furthermore, at least two of the plurality of light guides deliver light along different associated light distribution axes.

In another aspect, the present disclosure provides an imaging light source module including a plurality of light guides, a plurality of light emitting sources, and an intermediate image surface. Each of the plurality of light guides has an entrance face, an exit face, and at least one side wall, and all of the light guides are capable of delivering light along associated light distribution axes intersecting a common reference point. Each of the plurality of light emitting sources delivers light only to a single light guide of the plurality of light guides. The intermediate image surface comprises a plurality of pixels, where each pixel receives light from the exit face of a single associated light guide of the plurality of light guides.

These and other aspects of the present disclosure will be apparent from the detailed description below. In no event, however, should the above summaries be construed as limitations on the claimed subject matter.

BRIEF DESCRIPTION OF THE DRAWINGS

The present disclosure is described with respect to the appended Figures, wherein:

FIG. 5b is a schematic illustration of the far field luminance distribution of the light guide of FIG. 5a.

DETAILED DESCRIPTION

Projection systems are commonly used in relatively large scale information displays, such as those employed in conference rooms, theaters, meeting venues, and classrooms. Increasingly, technological advances are also making projection systems viable for use in smaller scale applications, such as in portable media players or mobile telephones. The present disclosure is directed toward components of projection systems, and may particularly be useful in compact projection systems.

Some projection systems include a source of light, illumination optics, an imager, projection optics and a projection screen. The illumination optics collect light from a light source and direct it to one or more imagers. The imagers, or image-forming spatial light modulators, are controlled by an electronically conditioned and processed digital signal and produce an image corresponding to the signal. Types of imagers commonly used in projection systems include liquid crystal on silicon (LCOS), digital micro-mirror device (DMD), and liquid crystal microdisplay. Projection optics magnify the image imposed on the light by the imager and project it onto the projection screen.

White light sources, such as arc lamps, have been and still are commonly used as light sources for projection display systems. Recently, light emitting diodes (LEDs) have been introduced as light sources owing to a number of desirable attributes, including longer lifetime, higher efficiency and superior thermal characteristics. The utility of LEDs and other luminescent solid-state technologies as light sources in projection systems may be extended beyond illumination of imagers. In a significant shift in projection system architecture, an array of luminescent elements may function both as light source and image forming device, thereby eliminating or reducing the need for spatial light modulators and illumination systems needed to deliver light to spatial light modulators. Such a pixelated light source is described in co-pending and co-owned PCT Patent Application No. US2008/055004, "Array of Luminescent Elements" (Haase), which claims the benefit of U.S. Provisional Patent Application Ser. No. 60/893,804, "Array of Luminescent Elements" (Haase). In the present disclosure, we describe projection systems incorporating arrayed light emitting sources and associated optics.

Figure 1A:
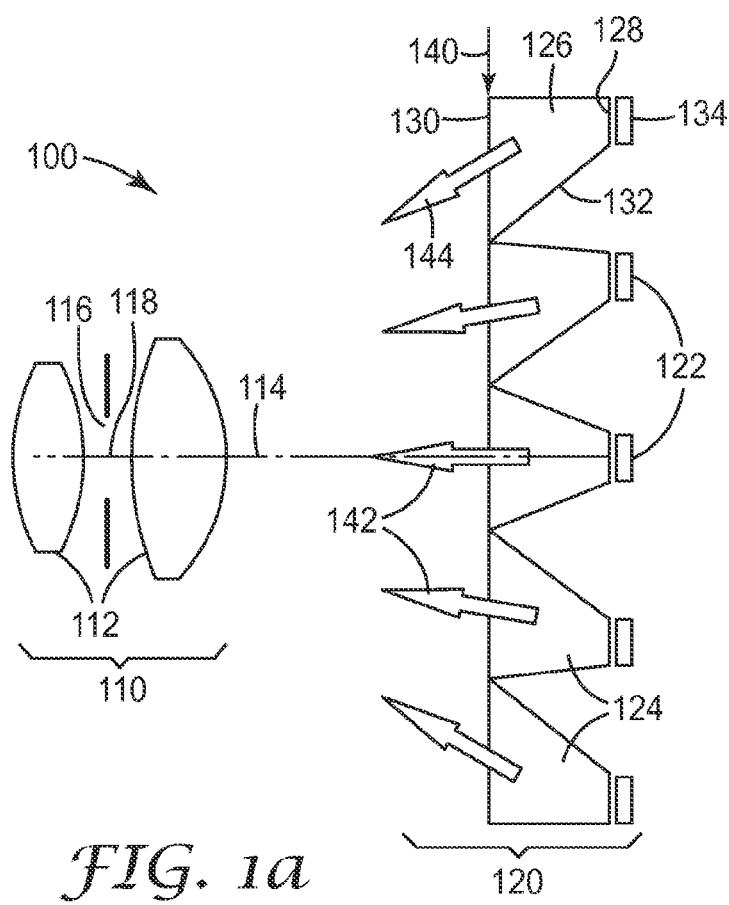
FIG. 1a is a schematic cross-sectional view of a projection system.

FIG. 1a is a schematic cross-sectional view of one embodiment of a projection system 100. The projection system 100 may include a projection lens 110 having one or more lens elements 112. The projection lens 110 has an optical axis 114 and an entrance pupil 116 that has a center 118.

Figure 1B:
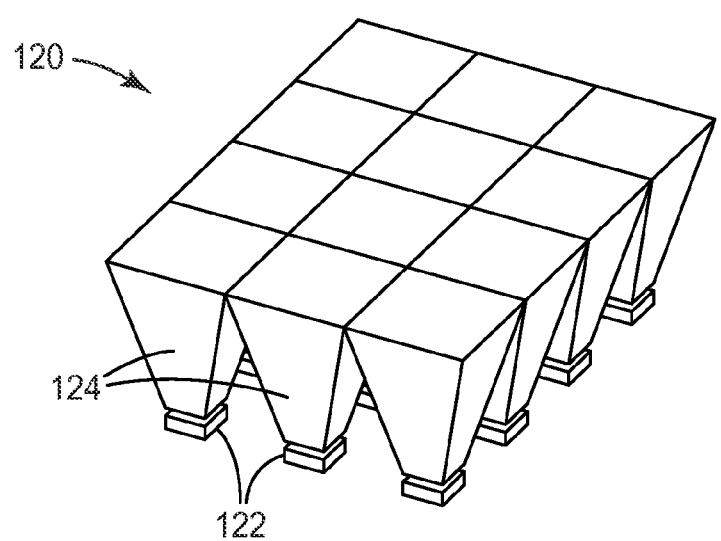
FIG. 1b is a schematic isometric view of an imaging light source module.

Projection system 100 includes an imaging light source module 120 that includes a plurality of light emitting sources 122 (such as LEDs) arranged in a one- or two-dimensional array and a plurality of light guides 124. The one- or two-dimensional array in which the plurality of light sources are arranged may be disposed on a planar or non-planar surface. FIG. 1b is a schematic isometric view of an imaging light source module 120 that includes light emitting sources 122 and light guides 124.

Each light guide, for example, light guide 126, has an entrance face 128, an exit face 130, and at least one side wall 132. An exit face of a light guide may include a light directing shape or structure. Entrance faces, exit faces, and cross-sections of light guides between entrance and exit faces may be round or polygonal, and for any particular light guide, those faces and cross-sections may be the same or different shapes at different parts along the light guide. The cross-sectional area of a light guide may remain constant along the light guide, or it may flare from an entrance face having a smaller area to an exit face having a larger area. In some embodiments, light guides may take the geometric form of a frustum.

Light guides may be hollow, or they may be formed of a solid, substantially clear optical material, such as acrylic, polycarbonate, glass, or any other suitable organic, inorganic, or composite material. The index of refraction of a solid light guide material will, in general, affect its performance. In the case of a hollow light guide, either the entrance face or the exit face (or both faces) may be an interface between media, or may be a geometric face defined by its perimeter, without a material interface at the face location.

The imaging light source module 120 may be arranged such that each light emitting source delivers light only to a single light guide. For example, in FIG. 1a, light emitting source 134 delivers light only to light guide 126. Each light guide, in general, receives light from at least one light emitting source through its entry face. In some embodiments, as discussed and illustrated elsewhere herein, light guides may receive light from multiple light sources.

Light emitting sources 122 may be coupled to light guides 124 with a substantially clear optical coupling material, such as an optical adhesive material (not shown), they may be in contact with each other without a coupling material, or they may be separated by an air gap, as illustrated. Minimization or removal of an air gap between the emitting surface of a light emitting source 122 and a light guide 124 typically enhances the efficiency of coupling of light from the light emitting source to the light guide, due, at least in part, to reduced Fresnel losses at interfaces between media of differing indices of refraction. On the other hand, the presence of an air gap adjacent an entrance face of a light guide, such as entrance face 128, may result in a narrow range of propagation angles within the light guide of light emitted from a light emitting source, and hence, higher brightness, compared to a case where a coupling material optically couples a light emitting source and light guide. In some embodiments of the present disclosure, light emitting sources are coupled to light guides by an optical coupling material. In other embodiments, light emitting sources and light guides are separated by air gaps.

Light received from a light source propagates within a light guide from the entrance face to the exit face. During this propagation, the light may reflect off one or more side walls of the light guide. Such reflections may be total internal reflections, they may be fresnel reflections that are less than total, and/or they may be reflections off of a reflective coating optionally included on one or more side walls of the light guide. Hollow light guides will generally employ reflective coatings on their side walls.

Each light guide of the plurality of light guides 124 delivers light via its exit face through an intermediate image surface 140. The intermediate image surface 140 may take its form collectively from the entire plurality of exit faces of the plurality of light guides 124. In the embodiment illustrated in FIG. 1a, the intermediate image surface 140 may be planar, in which case all of the exit faces of the plurality of light guides 124 are coplanar. In other embodiments, as described and illustrated herein, the intermediate image surface may not be planar.

Each light guide 124 may deliver light through a single associated pixel of a plurality of pixels of the intermediate image surface 140. In some embodiments, each light guide delivers light substantially only through a single associated pixel. A pixel, in general, is a picture element of an image. As used in reference to the pixels of an intermediate image surface, there is a one-to-one correspondence between pixels and exit faces of light guides. Each pixel receives light from the exit face of a single associated light guide.

Each light guide of the plurality of light guides 124 of imaging light source module 120 is disposed to deliver light through the intermediate image surface 140 to the entrance pupil 116 of the projection lens 110. The projection lens 110 is configured to receive light from the plurality of light guides 124 and deliver the light to form a projected image, which may be a real or a virtual image. The image formed on the intermediate image surface 140 by the output of the light guides is conjugate to this real or virtual image that is delivered by the projection lens 110.

In general, light that is not transmitted through the entrance pupil 116 of the projection lens 110 can not be delivered by the projection lens to form an image. In order to improve the delivery of light to the entrance pupil of the projection lens 110, different light guides of the plurality of light guides 124 may be configured to deliver light along different associated light distribution axes 142. For example, in FIG. 1a, light guide 126 delivers light along light distribution axis 144, which differs, in general, from other light distribution axes of a plurality of light distribution axes 142. Light distribution axes are, in general, mathematical vectors. When combined with the physical locations of their associated light guides 124 in an imaging light source module 120, light distribution axes 142 may be characterized in that they are configured to deliver light toward a center 118 of the entrance pupil 116 of the projection lens 110.

The center 118 of the entrance pupil 116 of the projection lens 110 provides a common reference point that light distribution axes 142 of an imaging light source module 120 intersect. In the absence of a projection lens 110, an imaging light source module 120 which may be designed for use with a projection lens may still be characterized by light distribution axes 142 that intersect a common reference point. In some embodiments, light source modules deliver light along light distribution axes that converge to a common reference point. In other embodiments, light source modules deliver light along light distribution axes that diverge from a common reference point.

Delivery of light toward the center 118 of the entrance pupil 116 of the projection lens 110 implies that the projection lens may be of a non-telecentric design. In some embodiments of projection systems of the present disclosure, non-telecentric projection lenses are employed. In some embodiments, projection systems may employ non-telecentric projection lenses for off-axis projection, in which neither the intermediate nor the projected image are centered along the optical axis of the projection lens, but rather are shifted off-axis. In other embodiments, a tilt of the projection lens may be employed to exploit the Scheimpflug principle. In some embodiments of an imaging light source module 120, every light guide 124 delivers light along a different associated light distribution axis 142. In general, the distribution of light from a light guide will depend on the particular geometric arrangement of light guide.

Figure 2:
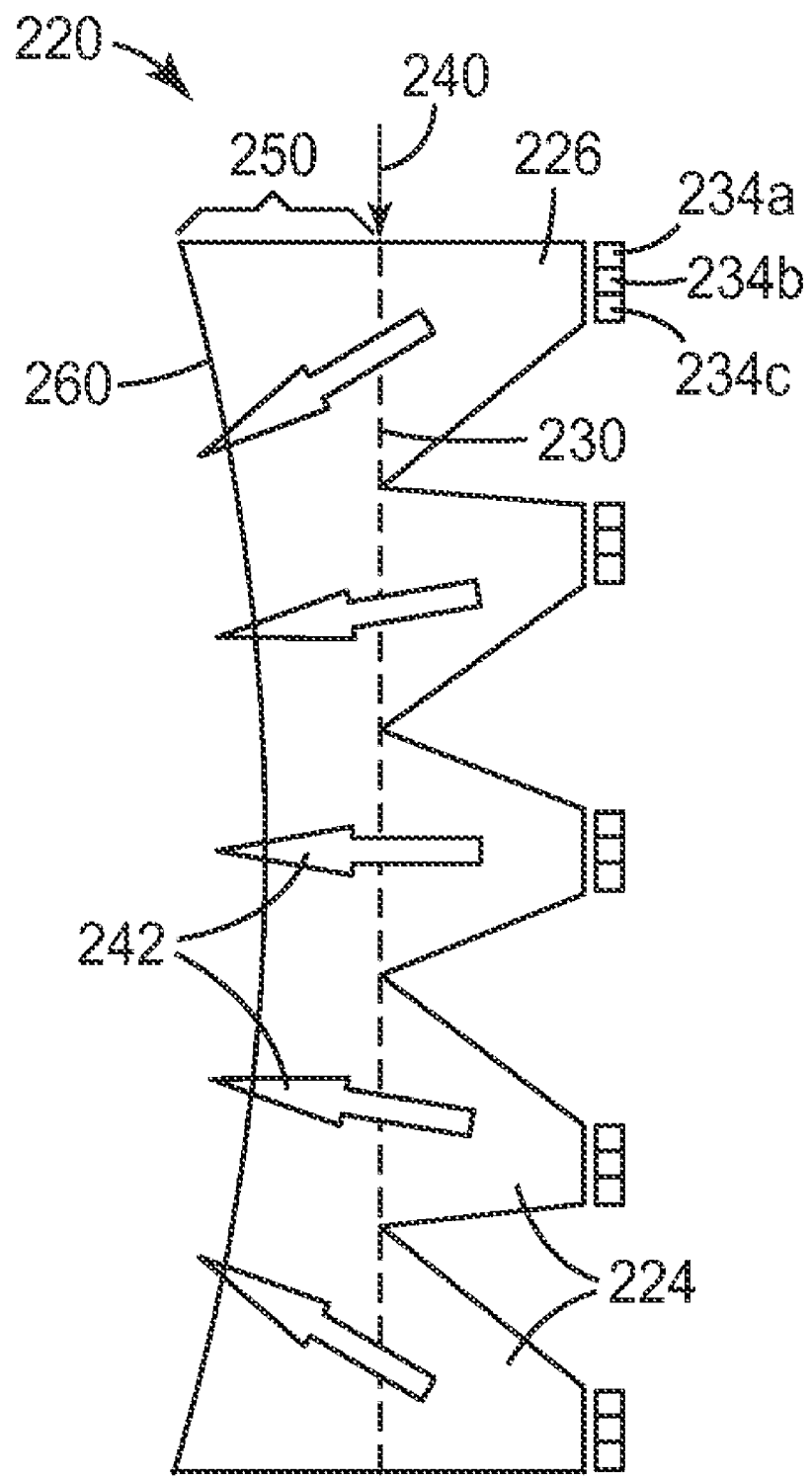
FIG. 2 is a schematic cross-sectional view of an imaging light source module.
Figure 3:
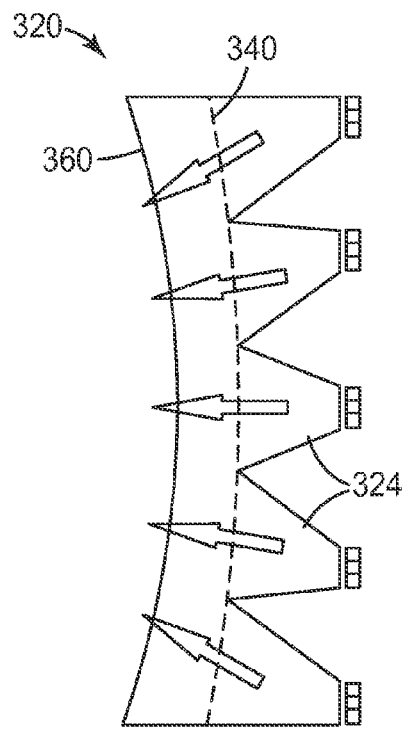
FIG. 3 is a schematic cross-sectional view of an imaging light source module.

FIGS. 2 and 3 are schematic cross-sectional views of embodiments of imaging light source modules that may be used in projection systems in accordance with the present disclosure. FIGS. 2 and 3 depict a number of variations possible with imaging light source modules. In general, any variation, feature, or characteristic represented in any of the figures of this disclosure and/or described in the detailed description may be incorporated into any other projection system disclosed herein to the extent that the variation is compatible with the projection system.

The imaging light source module 220 shown in FIG. 2 includes at least one light guide 226 that receives light from multiple light emitting sources 234a, 234b, and 234c. Light emitting sources 234a-c may be, for example, independently-addressable red, green, and blue emitters that may deliver light simultaneously in varying proportions to light guide 226 to result in a multi-color pixel at exit face 130. In another embodiment, light emitting sources 234a-c may be, for example, independently-addressable red, green, and blue emitters that may deliver light sequentially in varying proportions to light guide 226 to result in a time-averaged multi-color pixel at exit face 130, in what may be referred to as a color sequential system. In other embodiments, multiple light emitting sources of the same color may deliver light to a single light guide, for example, to achieve brightness, thermal, or other performance objectives. In still other embodiments, at least one light guide receives light from single associated light emitting source, which may emit mono-chromatic, white, or any other suitable single color.

The imaging light source module 220 shown in FIG. 2 includes a material portion 250 extending beyond the intermediate image surface 240. In this embodiment, the exit faces of light guides, such as exit face 230 of light guide 226, may or may not be at the interface between different materials. Nevertheless, as described herein, even if no interface between materials exists at a light guide exit face, the face is defined with respect to its perimeter, as formed by the geometry of the light guide.

The material portion 250 and the light guides 224 of imaging light source module 220 may be formed monolithically of the same material, or they may be formed separately and joined, formed from different or like materials. The choice of materials may be dictated, for example, by manufacturing reasons, or for optical, mechanical, or other performance reasons. If materials with different indices of refraction are used, then refraction may occur at the intermediate image surface where different media interface. If the intermediate image surface is not planar, as discussed herein with regard to FIG. 3, any such refraction may be further modified per Snell's Law.

Opposite the intermediate image surface 240, the material portion 250 of the imaging light source module may be bounded by a surface 260, which may be planar or non-planar, as illustrated. A non-planar surface 260 may have a concave, convex, aspheric, anamorphic, Fresnel, diffractive, or faceted shape, or may have any other suitable shape. The surface 260 may be made non-planar for a number of reasons. Some optical effects are sensitive to the angle of incidence of the output from light guides 224, as characterized by the light distribution axes 242, upon the surface 260. For example, if light from the light guides 224 is incident on surface 260 at different angles of incidence at different places from different light guides, then surface 260 may provide a refractive or lensing effect for that light that varies depending on position on the surface. Another reason to shape surface 260 may be to control the angle of incidence of light on the surface in order to reduce or modify losses due to Fresnel reflections. Such effects are discussed further herein in relation to FIG. 4.

In another embodiment, surface 260 may take the form of a microlens array, with one microlens associated with each pixel of the intermediate image surface 240. In such an embodiment, material portion 250 may be made thin such that the microlenses of surface 260 may be disposed in close proximity to their associated pixels. In the limit where the thickness of the material portion 250 is reduced to minimum thickness, such a configuration may be regarded as a collection of light guides 224 each with an individual lenslet on its exit face, without material portion 250 mechanically connecting the light guides 224.

Surface 260 may include an optical coating, for example, to reduce the magnitude of Fresnel reflections, as may any surface in any of the projection systems herein that may benefit from such a coating. Such coatings include, for instance, single layer quarter wave coatings, or more sophisticated multi-layer coatings of organic or inorganic materials, as are well understood in the art.

FIG. 3 shows another embodiment of an imaging light source module 320. In this embodiment, intermediate image surface 340 follows a non-planar curve, and the exit faces of the light guides 324, which are tangential to the intermediate imaging surface, are not coplanar. Furthermore, as the exit faces are not coplanar, when the imaging light source module 320 is combined with a projection lens in a projection system, at least some of the exit faces will not be normal to the optical axis of the projection lens. In contrast, in the embodiment illustrated in FIG. 1a, the exit faces of the light guides 124 are coplanar, and they are normal to the optical axis 114 of the projection lens 110. In another embodiment, the exit faces may be coplanar, but not normal to the optical axis of a projection lens.

Figure 4A:
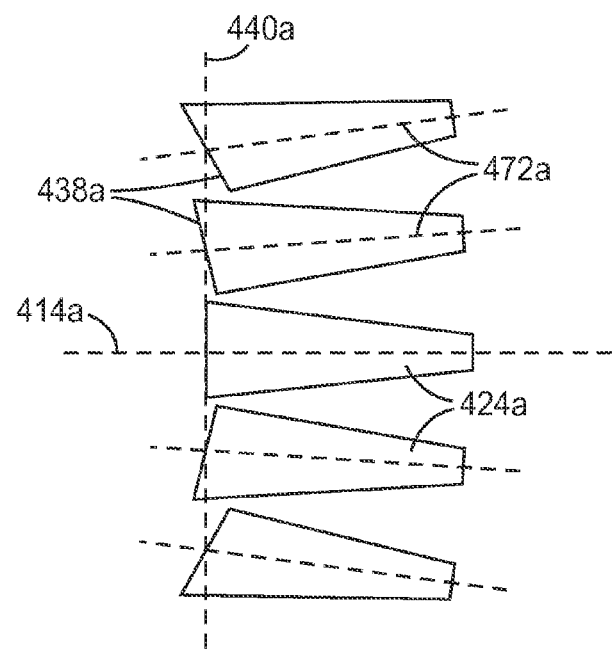
FIG. 4a is a schematic illustration of a collection of light guides.
Figure 4B:
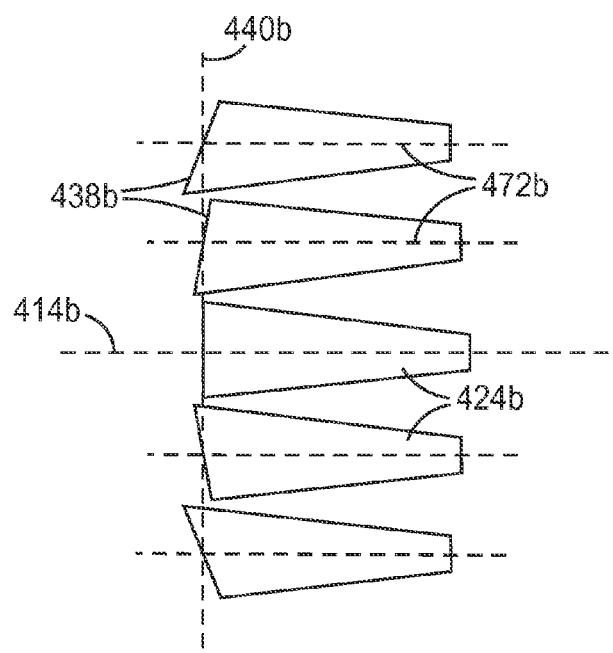
FIG. 4b is a schematic illustration of a collection of light guides.

FIGS. 4a and 4b are schematic illustrations of collections of light guides 424a and 424b that may be used in imaging light source modules. The light guides 424a of FIG. 4a differ from each other both in that they possess tilts, or cants, of their internal light distribution axes 472a relative to each other, and in that the exit faces 438a of the light guides have varying alignments relative to their respective internal light distribution axes.

The internal light distribution axis of a light guide is the direction of propagation within the light guide, just prior to exiting the light guide through the exit face, of the maximum intensity of light originating from the light guide's associated light emitting source(s). In general, a light guide of the present disclosure will tend to shape the distribution of such light so that the internal light distribution axis is closely aligned with the principal axis of inertia of the light guide.

For a solid light guide, the index of refraction of the light guide material is a factor that generally will affect the degree to which the light guide shapes the light distribution. A greater difference in index of refraction, for example, between air and a light guide material, potentially results in greater refractive power at the material interface, which may enhance a light guide's ability to direct light for a given light guide geometry. Use of higher refractive index materials may result in a light guide that is more effective in containing light via total internal reflection (T.I.R.) as well, while also potentially making such a light guide more susceptible to trapping light at the exit face, due to T.I.R. effects, as well as Fresnel reflections for light incident at less than the T.I.R. critical angle. The Fresnel reflections may be mitigated with appropriate anti-reflection coatings.

When light traveling within a light guide along an internal light distribution axis exits the light guide through its exit face, it may be redirected by the exit face to result in a light distribution axis such as one of the light distribution axes 142 of FIG. 1*a*, which characterize the propagation of light external to an imaging light source module. This is generally the case for the embodiments of FIG. 4 as well as other embodiments of this disclosure, and may be used by an imaging light source module designer to achieve desired light distributions.

In the cases of imaging light source modules 220 and 320 of FIGS. 2 and 3, such redirection may occur at surfaces 240 and 340 at exit faces of light guides, and/or surfaces 260 and 360, where light exits the imaging light source modules.

As illustrated in FIG. 4*a*, the relationship between internal light distribution axes 472*a* and exit faces 438*a* will tend to result in refraction away from the optical axis 414*a*, presuming the index of refraction of the light guides 424*a* is greater than that of the surrounding medium, usually air. In some embodiments, optical effects other than refraction, such as diffraction, may affect the distribution of light propagating from a light guide.

Comparing FIG. 4*b* to FIG. 4*a*, internal light distribution axes 472*b* of light guides 424*b* are parallel rather than canted, but the exit faces 438*b* are angled relative to their associated internal light distribution axes 472*b* in the opposite sense of those of FIG. 4*a*, hence resulting in refraction toward the optical axis 414*b*, which may be desirable for imaging light source modules of the present disclosure.

Another design consideration is that Fresnel reflection losses may be reduced or enhanced depending on the relative angles of exit faces to internal light distribution axes in various light guides. Appropriate anti-reflective coatings may mitigate such losses.

In some embodiments, exit faces of light guides may include lenses, diffractive structures, or any other suitable light redirecting structure.

Continuing with FIGS. 4*a* and 4*b*, light guides 424*a,b* deliver light through intermediate image surfaces 440*a,b*. In these embodiments, the exit faces 438*a,b* of the light guides 424*a,b* do not necessarily align neatly with the intermediate image surfaces 440*a,b*, in contrast to the embodiments illustrated in FIGS. 1, 2, and 3, where there is very close or perfect alignment of exit faces with intermediate image surfaces. The degree of alignment of exit faces with their associated intermediate image surfaces may result in a greater or lesser amount of "crosstalk" between pixels of the intermediate image surface.

To the degree that each light guide delivers light exclusively through a single associated pixel of the intermediate image surface, then "crosstalk" between pixels, the delivery of light information to neighboring pixels, may be eliminated, minimized, or limited to acceptable performance levels. In some embodiments, there is essentially no crosstalk between pixels at the intermediate image surface. In other embodiments, an acceptable amount of crosstalk may be present. In still other embodiments, it may be desirable for an amount of crosstalk to exist between pixels, for example, for performance, manufacturability, cost, or other reasons.

The intermediate image surface bears the image that serves as the object for the projection lens, when the projection system operates as intended. To provide high image quality, the light guides are located relative to the intermediate image surface to minimize crosstalk, insofar as crosstalk may be unavoidable due to other design features, such as tilting of exit faces as in FIGS. 4*a* and 4*b*, which may prevent alignment of exit faces in a way that eliminates crosstalk. The intermediate image surface is defined as a surface determined via a mathematical best fit of the centers of the exit faces of the light guides delivering light through the intermediate image surface. Generally, this surface will be essentially the same as or very close to a surface that minimizes the total amount of cross talk between pixels of the intermediate image surface.

As represented in FIGS. 4*a* and 4*b*, the center of each of the exit faces 438*a,b* of the light guides 424*a,b* touches the intermediate image surface 440*a,b*.

Figure 5A:
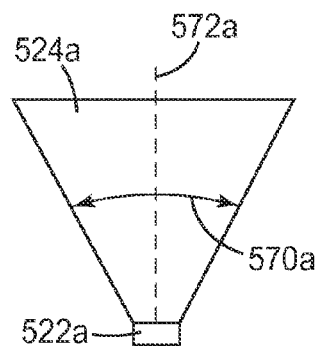
FIG. 5a is a schematic illustration of a light guide.
Figure 5B:
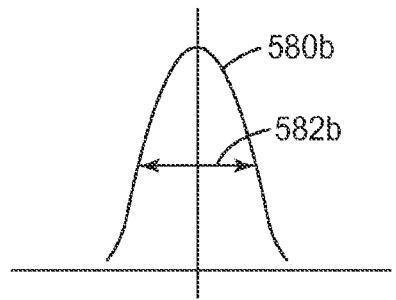
Figure 5C:
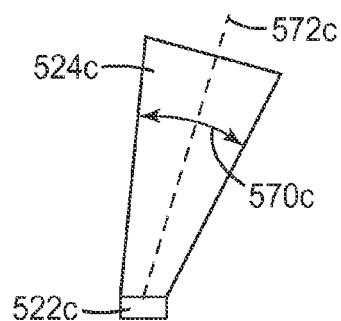
FIG. 5c is a schematic illustration of a light guide.
Figure 5D:
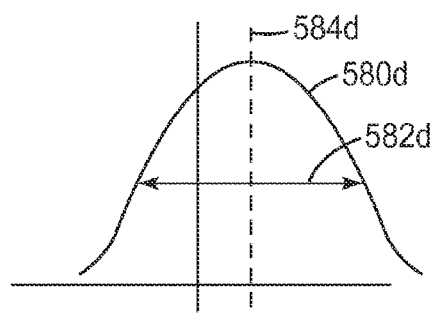
FIG. 5d is a schematic illustration of the far field luminance distribution of the light guide of FIG. 5c.

In general, the geometry of a light guide will affect its output distribution. FIGS. 5*a* and 5*c* are schematic illustrations of light guides (with light sources) and 5*b* and 5*d* are schematic representations of their corresponding far-field luminance distributions (luminance vs. angle). Comparing light guide 524*a* of FIG. 5*a* with light guide 524*c* of FIG. 5*c*, differences include (i) the larger angle 570*a* subtended by opposing walls of light guide 524*a* compared with angle 570*c* of light guide 524*c*, and (ii) the tilt or cant of light guide 524*c* compared with light guide 524*a*, as characterized by the internal light distribution axes 572*c* and 572*a*. These differences contribute to the luminance distributions 580*b* and 580*d* of FIGS. 5*b* and 5*d*, where distribution 580*b*, corresponding to light guide 524*a*, shows a narrower full-width at half-maximum (FWHM) 582*b*, compared to distribution 580*d* with FWHM 582*d*, corresponding to light guide 524*c*. The effect of the cant of light guide 524*c* is seen in the off-normal peak 584*d* of distribution 580*d*. The direction of the peak of the far field luminance distribution of a light guide, excluding exit face effects, extends in the direction of the internal light distribution axis. In some embodiments of projection systems of the present disclosure, at least one light guide has an internal light distribution axis not parallel to the optical axis of the projection lens. In some embodiments, at least two light guides deliver light with different far field luminance distribution widths.

Figure 6:
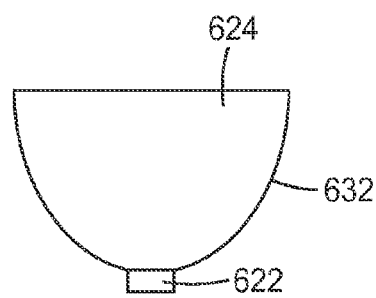
FIG. 6 is a schematic illustration of a light guide.

In FIGS. 1-5, light guides are drawn such that they appear to have substantially flat or planar side walls. In general, light guides may have planar or non-planar side walls. FIG. 6 is a schematic view of a light emitting source 622 with a light guide 624 having non-planar, curved side walls 632. In some embodiments, at least one light guide has non-planar walls. In other embodiments, every side wall of every light guide is planar.

Generally speaking, projection systems may be subject to a variety of phenomena or conditions that affect the quality of the projected image that they provide. For example, a projection lens may project an image with aberrations or distortions. Even if a distortion-free projection lens were available, perspective distortions due to the relative positions of projector and screen may come into play, such as a trapezoidal "keystone" image shape resulting when a projector illuminates a screen mounted off-axis. In another example, a projector may project an image onto a curved surface, such as a planetarium dome or the inside of a windshield, with the intent that an observer view an essentially rectilinear or Cartesian image, by which is meant an image comprising pixels arranged in a regularly-spaced rectangular array.

Figure 7:
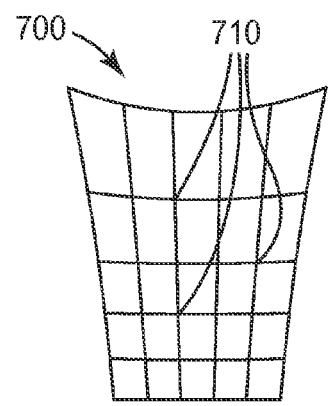
FIG. 7 is a schematic illustration of a non-Cartesian image array.

Projection systems of the present disclosure may be designed to account, at least in part, for such effects by deliberate arrangement of the imaging light source module. Pixels at the intermediate image surface may be arranged in a non-Cartesian array to compensate in advance for distortions later in the projection system. For example, FIG. 7 is a schematic illustration of such a non-Cartesian image array 700. Pixels are located at the grid intersections 710. Once projected onto a viewing surface, the projected image may be seen by a viewer as, for example, a square grid of pixels.

Figure 8:
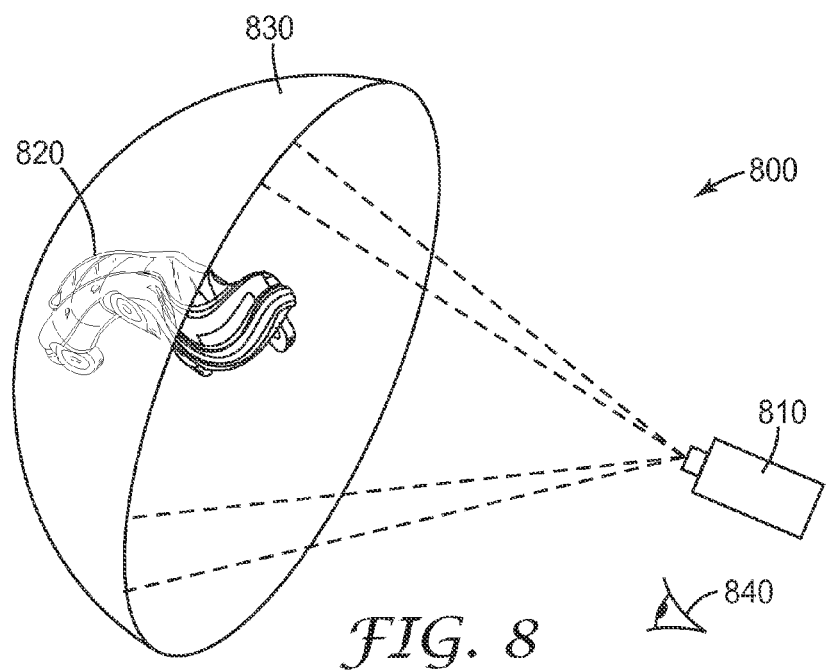
FIG. 8 is a schematic illustration of a projection system.

To illustrate the concept further, FIG. 8 is a schematic representation of a projection system 800. Projector 810 projects an image 820 (in the illustrated example, apparently a car) onto curved screen 830. If image 820 is viewed from any perspective other than that of observer 840, it may appear distorted, while observer 840 perceives a rectilinear, Cartesian image, where the pixels appear in a regular Cartesian array. Furthermore, it may be that if projector 810 were located in any location other than a designed-for position, or if the projector were to project on any screen other than a designed-for screen, it may or may not be able to project an image that an observer will perceive as Cartesian. Projector 810 is designed with pixels laid-out in a non-Cartesian pattern on the intermediate image surface to compensate for distortions occurring in projection system 800. The projection system 800 may include other distortion-compensatory features as well.

Projection systems incorporating imaging light source modules as described in the present disclosure may be configured such that the plurality of pixels of the intermediate image surface correspond one-to-one with a plurality of pixels of the projected image. In such a system, the image at the intermediate image surface may be essentially the same resolution image that is projected by the projection lens. In other projection systems incorporating imaging light source modules, the imaging light source module may serve as an illuminator for a higher-resolution imager, or spatial light modulator.

Figure 9:
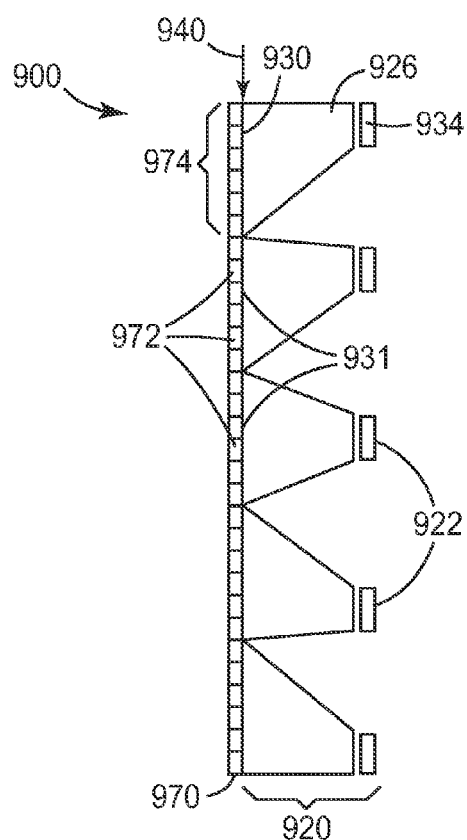
FIG. 9 is a schematic cross-sectional view of components of a projection system.

FIG. 9 is a schematic cross-sectional view of components of a projection system 900. Projection system 900 includes an imager 970, such as a liquid crystal microdisplay or any other suitable spatial light modulator, disposed in proximity to intermediate image surface 940 and capable of receiving light from the imaging light source module 920. The imager 970 includes a plurality of pixels 972 greater in quantity than the plurality of pixels of the intermediate image surface 940, the plurality of pixels of the intermediate image surface being the same as the plurality of exit faces 931 of the intermediate image surface. The imager 970 may impose a higher resolution image on the light than the image in the light output by the exit faces 931 of the imaging light source module 920.

The use, as in FIG. 9, of an imaging light source module 920 as an illuminator for an imager 970 may allow the use of the imaging light source module as an adaptive, zoned illuminator. For example, light guide 926 provides light only to pixels 974 of the imager 970. Light emitting source 934, then, need only provide the amount of light at exit face 930 necessary to achieve the required level of illumination for the brightest of the pixels 974, which may be less than the amount of illumination needed elsewhere on the imager 970. Higher contrast ratios and lower energy consumption are among the benefits that may result from such an arrangement. For such an embodiment to work in practice, it may be desirable for light guides to provide light that is substantially uniform in luminance and color over their exit faces. In some embodiments of the present disclosure, each of a majority of light guides provides light meeting such uniformity criteria. The light provided by the imaging light source module in such a projection system may be white. In this case, a color image may be achieved when the imager is employed in conjunction with a color filter array. In another embodiment, no color filter array is employed, but a multi-color projection system may be achieved with color sequential illumination from an imaging light source module.

In another embodiment of a projection system, an imaging light source module may serve as an illuminator for a higher-resolution reflective imager, such as a liquid crystal on silicon (LCOS), digital multimirror device (DMD, also known as a digital light processor, DLP), or other suitable imager. In such a system, an optical system may image the intermediate image surface onto the reflective imager, and other light handling components may be employed as well, such as a total internal reflection prism, as disclosed, for example, in co-owned and co-pending U.S. Provisional patent application Ser. No. 61/017,987, "Projection System," (Magarill). Any compatible features of embodiments described in connection with FIG. 9 may be employed in such a reflective imager based system as well.

Illustrative embodiments of this disclosure are discussed and in many cases, reference has been made to possible variations within the scope of this disclosure. Other variations and modifications in the disclosure may be apparent to those skilled in the art without departing from the scope of the disclosure, and it should be understood that this disclosure is not limited to the illustrative embodiments set forth herein.

What is claimed is:

1. A projection system, comprising:
    an imaging light source module, comprising:
        a plurality of light guides, each light guide having an entrance face, an exit face, and at least one side wall; and
        a plurality of light emitting sources, each light emitting source delivering light only to a single light guide of the plurality of light guides; and
    a projection lens configured to receive light from the plurality of light guides and deliver the light to form a projected image, the projection lens having an optical axis and an entrance pupil, the entrance pupil having a center;
    wherein each light guide is disposed to receive light from at least one light emitting source and deliver light though a single associated pixel of a plurality of pixels of an intermediate image surface, to the entrance pupil of the projection lens, and
    further wherein at least two of the plurality of light guides deliver light along different associated light distribution axes.

2. The projection system of claim 1, further wherein the different associated light distribution axes are configured to deliver light toward the center of the entrance pupil of the projection lens.

3. The projection system of claim 1, further wherein every light guide delivers light along a different associated light distribution axis.

4. The projection system of claim 1, further wherein at least one light guide has an internal light distribution axis not parallel to the optical axis of the projection lens.

5. The projection system of claim 1, further wherein all of the exit faces of the plurality of light guides are coplanar and normal to the optical axis of the projection lens.

6. The projection system of claim 1, further wherein at least two of the exit faces of the plurality of light guides are not coplanar.

7. The projection system of claim 1, further wherein at least one of the exit faces of the plurality of light guides is not normal to the optical axis of the projection lens.

8. The projection system of claim 1, further wherein at least two of the plurality of light guides deliver light with different far field distributions.

9. The projection system of claim 1, further wherein at least one side wall of at least one light guide has a reflective coating.

10. The projection system of claim 9, wherein the at least one light guide is hollow.

11. The projection system of claim 1, further wherein every side wall of every light guide is substantially planar.

12. The projection system of claim 1, further wherein at least one side wall of at least one light guide is non-planar.

13. The projection system of claim 1, further wherein the projection lens is non-telecentric.

14. The projection system of claim 1, further wherein the projected image is real.

15. The projection system of claim 1, further wherein the projected image is virtual.

16. The projection system of claim 1, further wherein the plurality of pixels of the intermediate image surface are arranged in a non-Cartesian array.

17. The projection system of claim 16, further wherein the non-Cartesian array is arranged to compensate for distortions in the projection system.

18. The projection system of claim 17, further wherein the projected image comprises a plurality of pixels that appear in a regular Cartesian array as viewed from an observer's perspective.

19. The projection system of claim 1, further wherein the plurality of pixels of the intermediate image surface correspond one-to-one with a plurality of pixels of the projected image.

20. The projection system of claim 1, further wherein each of a majority of light guides provides light that is substantially uniform in luminance and color over its exit face.

21. The projection system of claim 20, further comprising an imager comprising a plurality of pixels greater in quantity than the plurality of pixels of the intermediate image surface, the imager being capable of receiving light from the imaging light source module and imposing a higher resolution image on the light.

22. The projection system of claim 1, wherein the entrance and exit face of at least one light guide are non-parallel planar surfaces.

23. An imaging light source module, comprising:
- a plurality of light guides, each light guide having an entrance face, an exit face, and at least one side wall, all of the light guides being capable of delivering light along associated light distribution axes intersecting a common reference point; and
- a plurality of light emitting sources, each light emitting source delivering light only to a single light guide of the plurality of light guides;
- wherein each light guide is disposed to receive light from at least one light emitting source and deliver light through a single associated pixel of a plurality of pixels of an intermediate image surface.

24. An imaging light source module, comprising:
- a plurality of light guides, each light guide having an entrance face, an exit face, and at least one side wall, all of the light guides being capable of delivering light along associated light distribution axes intersecting a common reference point;
- a plurality of light emitting sources, each light emitting source delivering light only to a single light guide of the plurality of light guides; and
- an intermediate image surface comprising a plurality of pixels, each pixel receiving light from the exit face of a single associated light guide of the plurality of light guides.

* * * * *

UNITED STATES PATENT AND TRADEMARK OFFICE
CERTIFICATE OF CORRECTION

PATENT NO. : 8,408,721 B2
APPLICATION NO. : 13/057170
DATED : April 2, 2013
INVENTOR(S) : Roy A Auerbach It is certified that error appears in the above-identified patent and that said Letters Patent is hereby corrected as shown below:

In the Specifications:

<u>Column 1</u>
Line 27, delete "though" and insert -- through --, therefor.

In the Claims:

<u>Column 10</u>
Line 32, in Claim 1, delete "though" and insert -- through --, therefor.

Signed and Sealed this
Eleventh Day of June, 2013

Teresa Stanek Rea
*Acting Director of the United States Patent and Trademark Office*